United States Patent [19]
Lee et al.

[11] Patent Number: 6,160,657
[45] Date of Patent: Dec. 12, 2000

[54] ALL OPTICAL GAIN-CLAMPED AMPLIFIER AND METHOD THEREOF

[75] Inventors: Seung-hee Lee; Seong-ha Kim, both of Yongin, Rep. of Korea

[73] Assignee: Samsung Electronics Co., Ltd., Suwon, Rep. of Korea

[21] Appl. No.: 09/181,856

[22] Filed: Oct. 29, 1998

[30] Foreign Application Priority Data

Oct. 31, 1997 [KR] Rep. of Korea .................. 97-57260

[51] Int. Cl.[7] ...................................................... H01S 3/00
[52] U.S. Cl. ........................................... 359/334; 359/341
[58] Field of Search ...................................... 359/341, 333, 359/334

[56] References Cited

U.S. PATENT DOCUMENTS

| H1791 | 3/1999 | Williams ................................. 385/140 |
| 4,429,393 | 1/1984 | Giuliano . |
| 4,769,820 | 9/1988 | Holmes . |
| 5,239,607 | 8/1993 | da Silva et al. ........................ 385/122 |
| 5,537,244 | 7/1996 | Fukushima et al. . |
| 5,673,141 | 9/1997 | Gambini ................................. 359/341 |
| 5,872,649 | 2/1999 | Bryon et al. ............................ 359/341 |

FOREIGN PATENT DOCUMENTS

| 0 556 951 | 8/1993 | European Pat. Off. . |
| 0717478 | 6/1996 | European Pat. Off. . |

*Primary Examiner*—Mark Hellner
*Attorney, Agent, or Firm*—Burns, Doane, Swecker & Mathis, L.L.P.

[57] ABSTRACT

In an optical amplifier including an optical wavelength selective coupler for coupling an input optical signal by a wavelength selective coupling method, a gain medium for amplifying a signal from the optical wavelength selective coupler and outputting the amplified signal, and a pump connected to the optical wavelength selective coupler for causing a population inversion in the gain medium, an all optical gain-clamped amplifier further includes a nonlinear mineral material provided at the next part of the gain medium for restricting a signal output of the gain medium by emitting stimulated Brillouin scattered light, inputting it back to the gain medium and saturating the gain medium when the intensity of the input signal output from the gain medium is larger than preset standard value. In the optical amplifier as above, it is advantageous that in a wavelength division multiplexing network, when an input signal of n channels is changed to an input signal of (n−k) channels and is input into a gain medium due to circumstances such as faults, switching, adding and/or dropping of wavelengths, the gain medium is saturated without changing the population inversion level even though the number of channels of the input signal is changed, and a constant gain is obtainable with no relation to the number of channels.

4 Claims, 4 Drawing Sheets

ALL OPTICAL GAIN-CLAMPED AMPLIFIER AND METHOD THEREOF

This application claims priority under 35 U.S.C. §§119 and/or 365 to 97-57260 filed in Korea on Oct. 31, 1997; the entire content of which is hereby incorporated by reference.

BACKGROUND OF THE INVENTION

1. Field of the Invention

The present invention relates to an all optical gain-clamped amplifier, and more particularly, to an all optical gain-clamped amplifier which can keep the population inversion level of an amplifier which corresponds to variations in the number of input signal channels to a constant level by using stimulated Brillouin scattering (SBS) light which exhibits nonlinear characteristic to an input signal by employing a gain medium and a nonlinear mineral material of the third order nonlinearity, and therefore can automatically clamp a gain.

2. Description of the Related Art

In general, in an optical communications system, optical amplifiers are used to compensate for signal losses. In various all optical networks, signal losses vary according to variations in conditions due to circumstances such as faults, switching, adding and/or dropping.

FIG. 1 shows a schematic system block diagram of a conventional optical amplifier.

Referring to FIG. 1, a conventional optical amplifier comprises an optical wavelength selective coupler 11 for coupling an input optical signal by a wavelength selective coupling method, a gain medium 12 for amplifying a signal from the optical wavelength selective coupler 11 and outputting the amplified signal, and a pump 13 connected to the optical wavelength selective coupler 11 for causing a population inversion in the gain medium 12.

In the conventional optical amplifier having the above structure, when an input signal $P^{in1}_{sig}$/channel of n channels or an input signal $P^{in1}_{sig}$/channel of n−k channels is input into the gain medium 12 via the optical wavelength selective coupler 11, the gain medium 12 amplifies the input signal $P^{in1}_{sig}$/channel of n channels or the input signal $P^{in1}_{sig}$/channel of (n−k) channels and outputs $P^1_{out}$/channel or $P^2_{out}$/channel, respectively. At this time, the output signal $P^1_{out}$/channel of n channels can be expressed by $GP^{in1}_{sig}$/channel which is obtained by multiplying the input signal $P^{in1}_{sig}$/channel of n channels by a gain G, and the $P^2_{out}$/channel can be expressed by $G^1P^{in1}_{sig}$/channel which is obtained by multiplying the input signal $P^{in1}_{sig}$/channel of (n−k) channels by a gain $G^1$. Thus, the gains G and $G^1$ have different values. This means that the population inversion level of the gain medium 12 varies with variations in the level of a total input signal according to the variations in the number of channels of an input signal.

Thus, in the conventional optical amplifier, since the population inversion level varies with variations in the number of channels of an input signal, and therefore the signal output per each channel varies, it is difficult to design a system efficiently. As the complexity in all optical network, a major potential problem associated with the optical amplifier is a need for control of the gain due to circumstances such as faults, switching, adding and/or dropping of wavelengths. Transient effects as well as gain fluctuation result in degradation of signal quality in the surviving channel. So, they must be suppressed and a gain-clamped mechanism that can automatically clamp the gain per each channel of an amplifier according to the variations in the channel number of an input signal to a constant level is required. To date, the most promising candidate for the solution of these problems are based on the following two techniques. First, a lasing mechanism in the gain media either by using a couple of gratings at both ends or by forming a ring laser. Second, the feed back (forward) scheme where the optical power is measured and the pump power is adjusted to maintain appropriate population inversion level. The major drawback in the first technique is caused by the relaxation oscillation in the laser that prohibits switching near the relaxation oscillation frequency. In the second technique, optical signal power monitoring may be accompanied by information regarding existing number of signal channels in order to distinguish the change of input power levels and changes in number of signal channels or both thus making the system complicated. This may be an important issue in systems using pre-emphasis.

SUMMARY OF THE INVENTION

To solve the above problems, it is an objective of the present invention to provide an all optical gain-clamped amplifier which can keep the population inversion level of an amplifier which corresponds to the variations in the number of input signal channels to a constant level by using stimulated Brillouin scattering (SBS) light which exhibits a nonlinear characteristic to an input signal in a wavelength division multiplexing network and therefore can automatically clamp a gain.

Accordingly, to achieve the above objective, there is provided an optical amplifier comprising: an optical wavelength selective coupler for coupling an input optical signal by a wavelength selective coupling method; a gain medium for amplifying a signal from the optical wavelength selective coupler and outputting the amplified signal; a pump connected to the optical wavelength selective coupler for causing a population inversion in the gain medium; and a nonlinear mineral material provided at the next part of the gain medium for restricting a signal output of the gain medium by emitting stimulated Brillouin scattered light, inputting it back to the gain medium and saturating the gain medium when the intensity of the input signal output from the gain medium is larger than preset standard value.

Here, it is preferable that in particular, a nonlinear mineral of the third order nonlinearity is used as the nonlinear mineral material.

In addition, to achieve the above objective, there is provided a method of optical amplification using an optical amplifier comprising an optical wavelength selective coupler for coupling an input optical signal by a wavelength selective coupling method, a gain medium for amplifying a signal from the optical wavelength selective coupler and outputting the amplified signal, and a pump connected to the optical wavelength selective coupler for causing a population inversion in the gain medium, wherein a signal output of the gain medium is restricted by inputting predetermined characteristic light back to the gain medium in a direction reverse to the output direction of the gain medium and saturating the gain medium when the intensity of the input signal output from the gain medium is larger than preset standard value.

Here, it is preferable that stimulated Brillouin scattered light is used as the predetermined characteristic light.

According to the present invention as above, it is advantageous that in a wavelength division multiplexing network, when an input signal of n channels is changed to an input signal of (n−k) channels and is input into a gain medium due to circumstances such as faults, switching, adding and/or dropping of wavelengths, the gain medium is saturated without changing the population inversion level even though the number of channels of the input signal is changed, and a constant gain is obtainable with no relation to the number of channels.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

Figure 1:
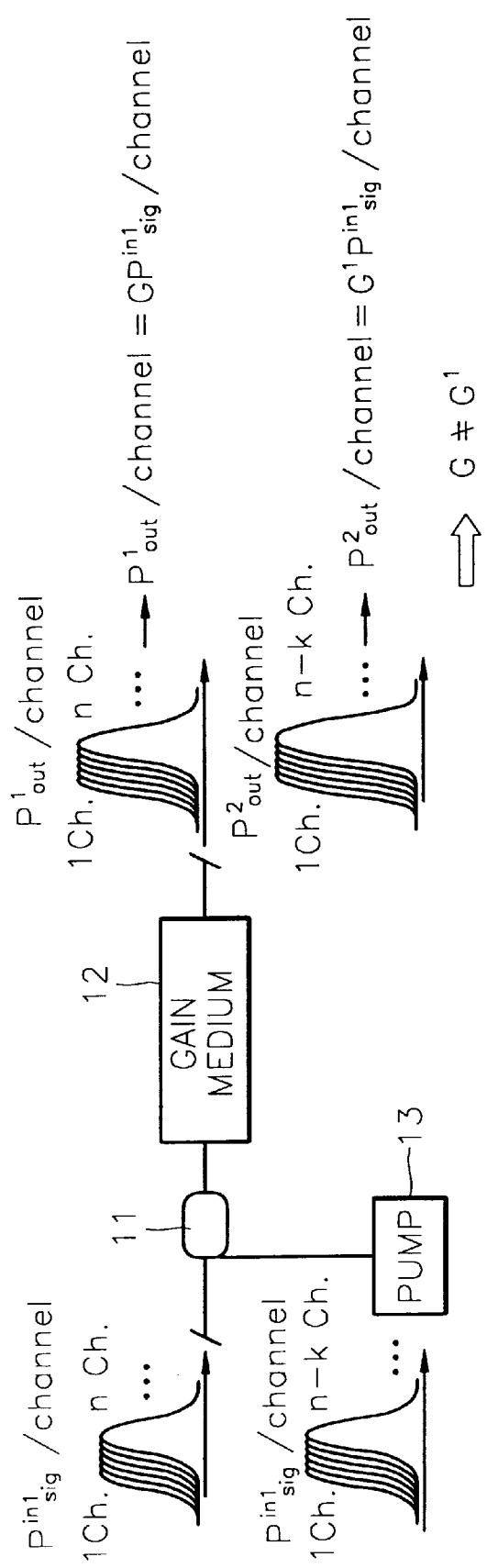
FIG. 1 is a schematic system block diagram of a conventional optical amplifier.
Figure 2:
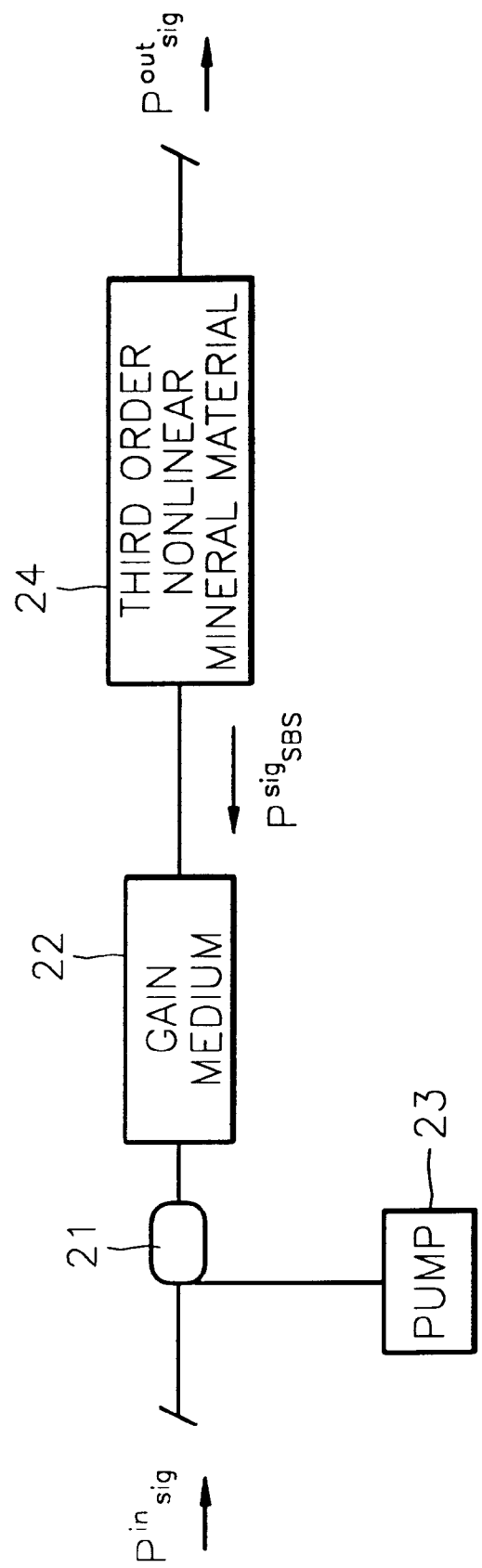
FIG. 2 is a schematic system block diagram illustrating an all optical gain-clamped amplifier according to the present invention.

Referring to FIG. 2, an optical amplifier according to the present invention an optical wavelength selective coupler 21 for coupling an input optical signal by a wavelength selective coupling method, a gain medium 22 for amplifying a signal from the optical wavelength selective coupler 21 and outputting the amplified signal, a pump 23 connected to the optical wavelength selective coupler 21 for causing a population inversion in the gain medium 22, and a nonlinear mineral material 24 provided at the next part of the gain medium 22 for restricting a signal output of the gain medium 22 by emitting SBS light, inputting it back to the gain medium 22 and saturating the gain medium 22 when the intensity of the input signal output from the gain medium 22 is larger than preset standard value.

Here, particularly, a nonlinear mineral of the third order nonlinearity is preferably used as the nonlinear mineral material 24.

Now, the operation of the optical amplifier having the above structure according to the present invention will be described with reference to FIGS. 3 and 4.

Figure 3:
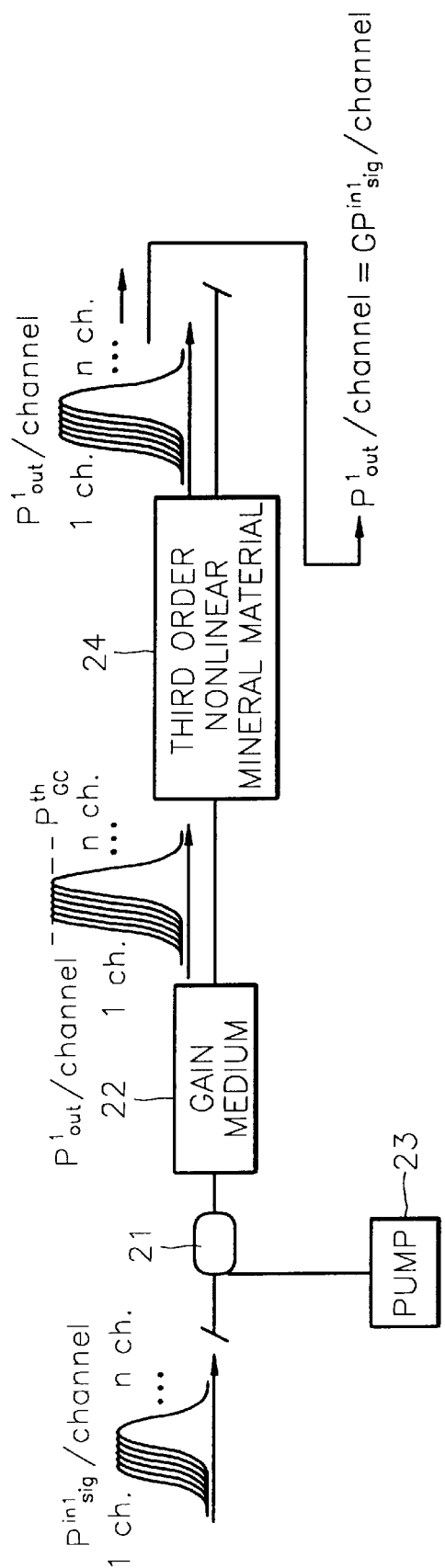
FIGS. 3 and 4 are diagrams illustrating amplification characteristics of input signals of different intensity in an all optical gain-clamped amplifier according to the present invention.

Referring to FIG. 3, when an input signal $P^{in1}_{sig}$/channel of n channels is input to the gain medium 22 via the optical wavelength selective coupler 21, the gain medium 22 amplifies the intensity of the input signal $P^{in1}_{sig}$/channel of n channels and outputs the amplified signal. At this time, when the intensity of the input signal $P^{1}_{out}$/channel of n channels output from the gain medium 22 is smaller than the intensity Of $P^{th}_{GC}$ as shown in FIG. 3, an output signal $P^{1}_{out}$/channel= $GP^{in1}_{sig}$/channel of n channels is finally output via the third order nonlinear mineral material 24. At this time, the gain is G.

Figure 4:
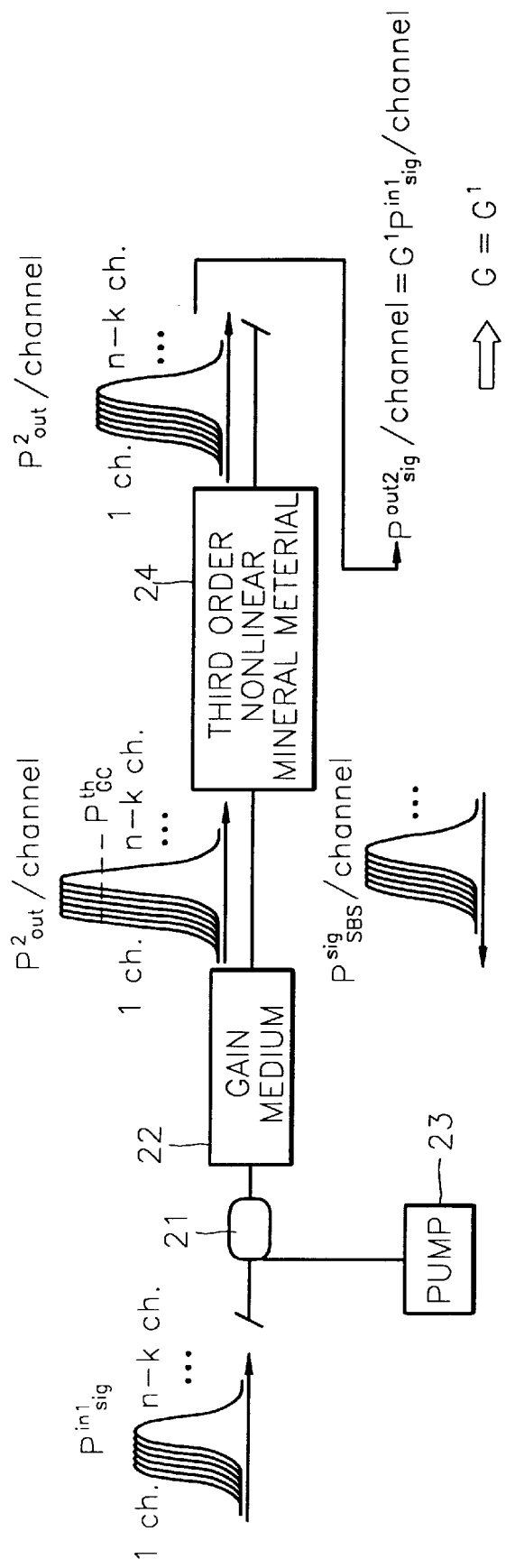

On the other hand, as shown in FIG. 4, when an input signal $P^{in1}_{sig}$/channel of (n−k) channels is input to the gain medium 22 via the optical wavelength selective coupler 21, the gain medium 22 amplifies the intensity of the input signal $P^{in1}_{sig}$/channel of (n−k) channels and outputs the amplified signal. At this time, when the intensity of the input signal $P^{2}_{out}$/channel of (n−k) channels output from the gain medium 22 is larger than the intensity of $P^{th}_{GC}$ as shown in FIG. 4, the third order nonlinear mineral material 24 outputs a $P^{sig}_{SBS}$/channel scattered in the opposite direction of the signal by the characteristics of the SBS. Then, the $P^{sig}_{SBS}$/channel is input back to the gain medium 22 and saturates the gain medium 22. Accordingly, the final output output via the third order nonlinear mineral material 24 is an output signal $P^{out2}_{sig}$/channel=$G^{1}P^{in1}_{sig}$/channel of (n−k) channels. At this time, the gain is $G^{1}$. On inspection of the intensity of the output signal of FIG. 3, the $G^{1}$ is the same as the gain G, which means that though the number of channels of an input signal is changed, the gain is clamped to a constant level by the action of the third order nonlinear mineral material 24.

Here, explaining the SBS in detail, when very intense light enters the third order nonlinear mineral material 24, the interaction of photons and phonons of the material generates a Stoke's signal scattered in the opposite direction of a signal, and such scattering is called SBS and increases in proportion to the increase in the intensity of the input optical signal. In addition, $P^{th}_{GC}$ represents a critical point by which the gain can be controlled to be clamped to a preset value by feeding back the SBS generated from the third order nonlinear mineral material 24 to the gain medium 22 and saturating the gain medium 22.

As described above, the optical amplifier according to the present invention enables realization of an all optical gain-clamped amplifier in which in a wavelength division multiplexing network, when an input signal of n channels is changed to an input signal of (n−k) channels and is input into a gain medium due to circumstances such as faults, switching, adding and/or dropping of wavelengths, the gain medium is saturated without changing the population inversion level even though the number of channels of the input signal is changed, and a constant gain per each channel is obtainable with no relation to the number of channels.

What is claimed is:

1. An optical amplifier comprising:

an optical wavelength selective coupler for coupling an input optical signal by a wavelength selective coupling method;

a gain medium for amplifying a signal from the optical wavelength selective coupler and outputting the amplified signal;

a pump connected to the optical wavelength selective coupler for causing a population inversion in the gain medium; and a nonlinear mineral material provided at the next part of the gain medium for restricting a signal output of the gain medium by emitting stimulated Brillouin scattered light, inputting it back to the gain medium and saturating the gain medium when the intensity of the input signal output from the gain medium is larger than preset standard value.

2. The optical amplifier as claimed in claim 1, wherein the nonlinear mineral material has the three order nonlinearity.

3. A method of optical amplification using an optical amplifier comprising an optical wavelength selective coupler for coupling an input optical signal by a wavelength selective coupling method, a gain medium for amplifying a signal from the optical wavelength selective coupler and outputting the amplified signal, and a pump connected to the optical wavelength selective coupler for causing a population inversion in the gain medium, wherein a signal output of the gain medium is restricted by inputting predetermined characteristic light which is scattered back to the gain medium in a direction opposite to the output direction of the gain medium and saturating the gain medium when the intensity of the input signal output from the gain medium is larger than preset standard value.

4. The method as claimed in claim 3, wherein stimulated Brillouin scattered light is used as the predetermined characteristic light.

* * * * *